(12) United States Patent
Lei et al.

(10) Patent No.: US 12,184,420 B2
(45) Date of Patent: Dec. 31, 2024

(54) APPARATUS AND METHOD OF ONE-SHOT HARQ-ACK CODEBOOK DETERMINATION

(71) Applicant: LENOVO (BEIJING) LIMITED, Beijing (CN)

(72) Inventors: Haipeng Lei, Beijing (CN); Alexander Golitschek Edler Von Elbwart, Darmstadt (DE); Yu Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 367 days.

(21) Appl. No.: 17/625,664

(22) PCT Filed: Jul. 12, 2019

(86) PCT No.: PCT/CN2019/095845
§ 371 (c)(1),
(2) Date: Jan. 7, 2022

(87) PCT Pub. No.: WO2021/007719
PCT Pub. Date: Jan. 21, 2021

(65) Prior Publication Data
US 2022/0231795 A1    Jul. 21, 2022

(51) Int. Cl.
*H04L 1/1812* (2023.01)
*H04L 1/08* (2006.01)
(Continued)

(52) U.S. Cl.
CPC .............. *H04L 1/1812* (2013.01); *H04L 1/08* (2013.01); *H04L 5/0053* (2013.01); *H04W 72/0446* (2013.01); *H04W 72/23* (2023.01)

(58) Field of Classification Search
CPC ....... H04L 1/1812; H04L 1/08; H04L 5/0053; H04W 72/23; H04W 72/0446
See application file for complete search history.

(56) References Cited

U.S. PATENT DOCUMENTS

| | | | | |
|---|---|---|---|---|
| 2019/0103943 A1* | 4/2019 | Wang | ............... | H04L 1/1854 |
| 2019/0306923 A1* | 10/2019 | Xiong | ............... | H04J 13/0062 |

FOREIGN PATENT DOCUMENTS

| | | |
|---|---|---|
| CN | 108809534 A | 11/2018 |
| CN | 109391422 A | 2/2019 |

(Continued)

OTHER PUBLICATIONS

International Searching Authority, "Written Opinion of the International Searching Authority," PCT/CN2019/095845, Apr. 8, 2020, pp. 1-4.

(Continued)

*Primary Examiner* — Duc C Ho
(74) *Attorney, Agent, or Firm* — Kunzler Bean & Adamson

(57) ABSTRACT

Apparatus and methods for one-shot HARQ-ACK codebook determination are disclosed. The apparatus includes: a receiver that receives a first signal configuring a number of Downlink (DL) Hybrid Automatic Repeat Request (HARQ) processes, and a second signal triggering a HARQ-Acknowledgement (HARQ-ACK) feedback for each of the number of DL HARQ processes; and a transmitter that transmits a HARQ-ACK codebook, wherein the HARQ-ACK codebook comprises a first part including the HARQ-ACK feedback for each of the number of DL HARQ processes. The HARQ-ACK codebook may further comprise a second part and each bit in the second part corresponds to a HARQ process of the number of DL HARQ process with positive acknowledgement reported in the first part for the HARQ process.

20 Claims, 5 Drawing Sheets

---

702
receiving a first signal configuring a number of Downlink (DL) Hybrid Automatic Repeat Request (HARQ) processes, and a second signal triggering a HARQ-Acknowledgement (HARQ-ACK) feedback for each of the number of DL HARQ processes 704
transmitting a HARQ-ACK codebook, wherein the HARQ-ACK codebook comprises a first part including the HARQ-ACK feedback for each of the number of DL HARQ processes

(51) Int. Cl.
*H04L 5/00* (2006.01)
*H04W 72/0446* (2023.01)
*H04W 72/23* (2023.01)

(56) References Cited

FOREIGN PATENT DOCUMENTS

| WO | WO-2018128474 A1 * | 7/2018 | ........... H04L 1/0057 |
|----|----|----|----|
| WO | 2019114503 A1 | 6/2019 | |
| WO | 2020231515 A1 | 11/2020 | |

OTHER PUBLICATIONS

Huawei, Hisilicon, HARQ enhancements in NR unlicensed, 3GPP TSG RAN WG1 Meeting #97, R1-1906046, May 13-17, 2019, pp. 1-14, Reno, USA.

Ericsson, HARQ and scheduling enhancements for NR-U, 3GPP TSG-RAN WG1 Meeting #97, R1-1907456, May 13-17, 2019, pp. 1-15, Reno, NV, USA.

Qualcomm Incorporated, Enhancements to Scheduling and HARQ operation for NR-U, 3GPP TSG RAN WG1 Meeting #97, R1-1907263, May 13-May 17, 2019, pp. 1-12, Reno, US.

Nokia, Nokia Shanghai Bell, 3GPP TSG RAN WG1 Ad-Hoc Meeting #97, R1-1906644, May 13-18, 2019, pp. 1-14, Reno, USA.

\* cited by examiner

APPARATUS AND METHOD OF ONE-SHOT HARQ-ACK CODEBOOK DETERMINATION

FIELD

The subject matter disclosed herein relates generally to wireless communication, and more particularly relates to, but not limited to, apparatus and methods of one-shot HARQ-ACK codebook determination for HARQ-ACK transmission on unlicensed spectrum.

BACKGROUND

The following abbreviations and acronyms are herewith defined, at least some of which are referred to within the following description.

Third Generation Partnership Project ("3GPP"), 5th Generation ("5G"), New Radio ("NR"), 5G Node B ("gNB"), Long Term Evolution ("LTE"), LTE Advanced ("LTE-A"), Evolved UMTS Terrestrial Radio Access Network ("E-UTRAN"), E-UTRAN Node B/Evolved Node B ("eNB"), Universal Mobile Telecommunications System ("UMTS"), Worldwide Interoperability for Microwave Access ("WiMAX"), Wireless Local Area Networking ("WLAN"), Orthogonal Frequency Division Multiplexing ("OFDM"), Single-Carrier Frequency-Division Multiple Access ("SC-FDMA"), Downlink ("DL"), Uplink ("UL"), User Entity/Equipment ("UE"), Network Equipment ("NE"), millimeter Wave ("mmWave"), Hybrid Automatic Repeat Request ("HARQ"), Acknowledgement ("ACK"), Hybrid Automatic Repeat Request Acknowledgement ("HARQ-ACK"), Radio Access Technology ("RAT"), Negative Acknowledgement ("NACK"), Receive ("RX"), Transmit ("TX"), Downlink Control Information ("DCI"), Physical Downlink Control Channel ("PDCCH"), Very-large-scale Integration ("VLSI"), Frequency Division Multiple Access ("FDMA"), Multiple-Input Multiple-Output ("MIMO"), Multi-User MIMO ("MU-MIMO"), Physical Uplink Control Channel ("PUCCH"), Channel State Information Reference Signal ("CSI-RS"), control-resource set ("CORESET"), Uplink Control Information ("UCI"), Transmit Receive Points ("TRP"), Channel Occupancy Time ("COT"), Code Block Group ("CBG"), Listen Before Talk ("LBT"), Maximum Channel Occupancy Time ("MCOT"), NR access on unlicensed spectrum ("NR-U"), Physical Downlink Shared Channel ("PDSCH"), Physical Uplink Shared Channel ("PUSCH"), Radio Resource Control ("RRC"), Transport Block ("TB"), Transport Block Size ("TBS"), Radio Link Control ("RLC"), Downlink Assignment Index ("DAI"), HARQ Process ID ("HPID"), Automatic Repeat Request ("ARQ"), Carrier Aggregation ("CA"), Retransmitted ACK Indication ("RAI").

In wireless communication, such as a Third Generation Partnership Project (3GPP) mobile network, a wireless mobile network may provide a seamless wireless communication service to a wireless communication terminal having mobility, i.e., user equipment (UE). The wireless mobile network may be formed of a plurality of base stations, and a base station may perform wireless communication with UEs.

The 5G New Radio (NR) is the latest in the series of 3GPP standards which supports very high data rate with lower latency compared to its predecessor LTE (4G) technology.

In 3GPP 5G NR, the downlink (DL) transport blocks (TBs) are carried on the Physical Downlink Shared Channel (PDSCH) from a gNB to a UE. In one example, a maximum of two TBs can be transmitted on PDSCH in one serving cell and in one slot. HARQ-ACK (Hybrid Automatic Repeat Request Acknowledgement) represents the Positive Acknowledgement (ACK) and the Negative Acknowledgement (NACK) collectively. ACK means that a TB is correctly received by the UE while NACK means a TB is erroneously received by the UE.

For TB-based retransmission, one HARQ-ACK feedback bit corresponds to one TB. A HARQ-ACK information bit value of 0 represents a NACK while a HARQ-ACK information bit value of 1 represents an ACK. The HARQ-ACK feedback bits corresponding to the PDSCH are transmitted either on the Physical Uplink Control Channel (PUCCH) or on the Physical Uplink Shared Channel (PUSCH) from the UE to the gNB.

In NR, besides the TB-based retransmission, CBG (code block group)-based retransmission is also supported. The intention of the CBG is to group several code blocks into one code block group, and as a result, the HARQ-ACK feedback is generated per CBG. Only if all the code blocks within one CBG are correctly decoded, the HARQ-ACK for the CBG can be set to ACK; otherwise, it is set to NACK. Upon the reception of the HARQ-ACK feedback, only the CBG(s) with NACK(s) shall be retransmitted by the transmitter at the gNB side.

For CBG-based retransmission, RRC signaling is used to configure the maximum number of CBGs per TB. The maximum number of CBGs per TB can be 2, 4, 6 or 8. For both semi-static HARQ-ACK codebook and dynamic HARQ-ACK codebook, the number of HARQ-ACK bits for one TB is equal to the configured maximum number of CBGs per TB, regardless of the variable transport block size (TBS) of a given TB.

HARQ-ACK feedback for multiple PDSCHs can be multiplexed in one HARQ-ACK codebook by means of HARQ-ACK multiplexing. There are two methods for HARQ-ACK codebook determination for NR Rel-15:

Semi-static HARQ-ACK codebook (also named Type 1 in TS38.213)—
The semi-static HARQ-ACK codebook size is determined based on the configured number of TBs of one PDSCH, the configured number of candidate PDSCH occasions in the time domain, the configured number of DL carriers, and the configured maximum number of CBGs per TB. Thus, the semi-static HARQ-ACK codebook determination is more robust to missed and/or false DCI detections than the dynamic HARQ-ACK codebook determination. However, this robustness comes at the expense of more bits for HARQ-ACK feedback.

Dynamic HARQ-ACK codebook (also named Type 2 in TS38.213)—
The dynamic HARQ-ACK codebook size is determined based on the number of actually received DL transmissions to be acknowledged in a same slot. In order to solve the problems of missed and false DCI detections, counter Downlink Assignment Index (DAI) and total DAI field are specified in the DCI.

SUMMARY

According to a first aspect, there is provided an apparatus comprising: a receiver that receives a first signal configuring a number of Downlink (DL) Hybrid Automatic Repeat Request (HARQ) processes, and a second signal triggering a HARQ-Acknowledgement (HARQ-ACK) feedback for each of the number of DL HARQ processes; and a transmitter that transmits a HARQ-ACK codebook, wherein the HARQ-ACK codebook comprises a first part including the HARQ-ACK feedback for each of the number of DL HARQ processes.

The HARQ-ACK codebook may further comprise a second part and each bit in the second part corresponds to a HARQ process of the number of DL HARQ process with positive acknowledgement reported in the first part for the HARQ process.

According to a second aspect, there is provided an apparatus comprising: a transmitter that transmits a first signal configuring a number of Downlink (DL) Hybrid Automatic Repeat Request (HARQ) processes, and a second signal triggering a HARQ-Acknowledgement (HARQ-ACK) feedback for each of the number of DL HARQ processes; and a receiver that receives a HARQ-ACK codebook, wherein the HARQ-ACK codebook comprises a first part including the HARQ-ACK feedback for each of the number of DL HARQ processes.

According to a third aspect, there is provided a method comprising: receiving a first signal configuring a number of Downlink (DL) Hybrid Automatic Repeat Request (HARQ) processes, and a second signal triggering a HARQ-Acknowledgement (HARQ-ACK) feedback for each of the number of DL HARQ processes; and transmitting a HARQ-ACK codebook, wherein the HARQ-ACK codebook comprises a first part including the HARQ-ACK feedback for each of the number of DL HARQ processes.

According to a fourth aspect, there is provided a method comprising: transmitting a first signal configuring a number of Downlink (DL) Hybrid Automatic Repeat Request (HARQ) processes, and a second signal triggering a HARQ-Acknowledgement (HARQ-ACK) feedback for each of the number of DL HARQ processes; and receiving a HARQ-ACK codebook, wherein the HARQ-ACK codebook comprises a first part including the HARQ-ACK feedback for each of the number of DL HARQ processes.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
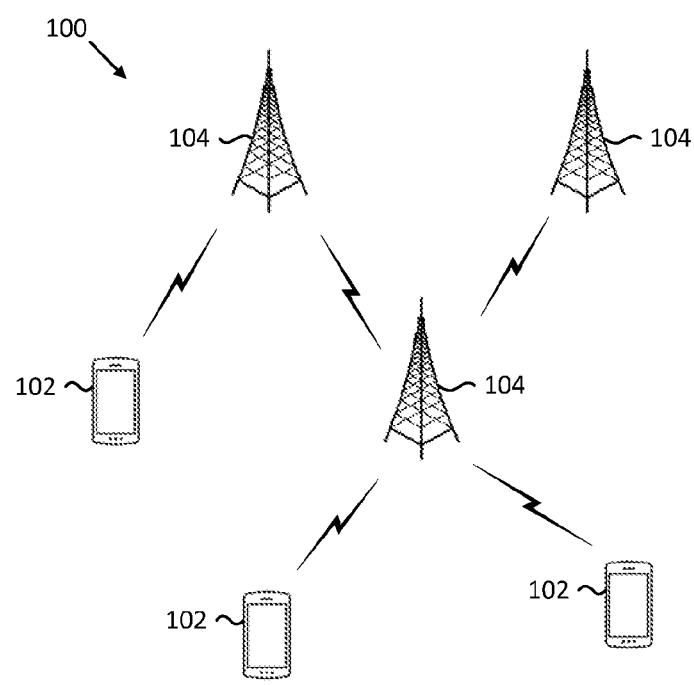
FIG. 1 is a schematic diagram illustrating a wireless communication system.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable Compact Disc Read-Only Memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 is a schematic diagram illustrating a wireless communication system. It depicts an embodiment of a wireless communication system 100 for one-shot HARQ-ACK codebook determination. In one embodiment, the wireless communication system 100 may include user equipment (UE) 102 and network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NEs 104 may also be referred to as a base station, an access point, an access terminal, a base, a Node-B, an eNB, a gNB, a Home Node-B, a relay node, an apparatus, a device, or by any other terminology used in the art. Throughout this specification, a reference to base station may refer to any one of the above referenced types of the network equipment 104, such as eNB and gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with 3GPP 5G new radio (NR). In some implementations, the wireless communication system 100 is compliant with the 3GPP protocol, where the NEs 104 transmit using an OFDM modulation scheme on the DL and the UEs 102 transmit on the UL using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Figure 2:
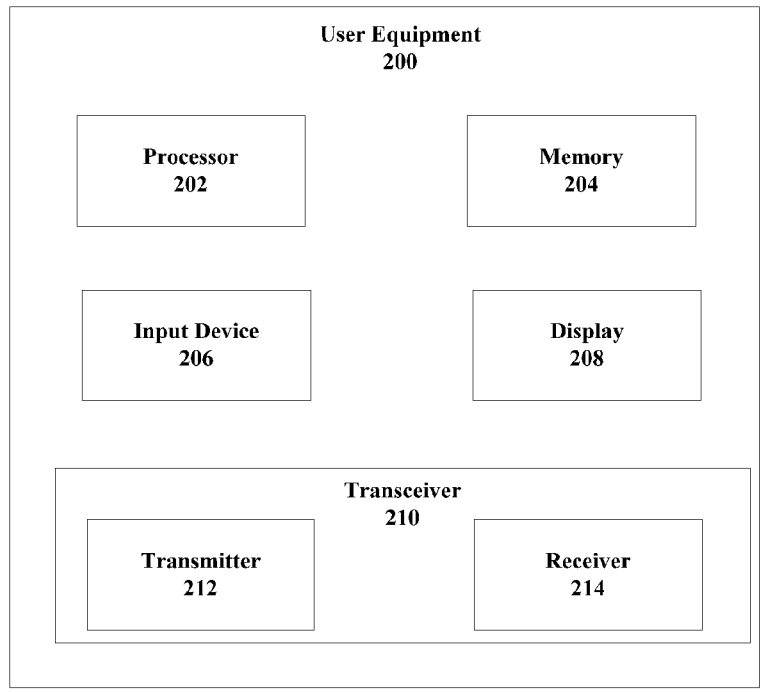
FIG. 2 is a schematic block diagram illustrating an apparatus that may be used for one-shot HARQ-ACK codebook determination according to one embodiment.

FIG. 2 is a schematic block diagram illustrating an apparatus that may be used for one-shot HARQ-ACK codebook determination. In one embodiment, the apparatus includes user equipment (UE) 200. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and display 208 may form a touchscreen or similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment. For example, the transmitter 212 may transmit a HARQ-ACK codebook for one or more DL transmissions. As another example, the receiver 214 may receive various configurations/data from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, each the transmitter 212 and the receiver 214 pair configured to communicate on a different wireless network and/or radio frequency band from another transmitter 212 and receiver 214 pair.

Figure 3:
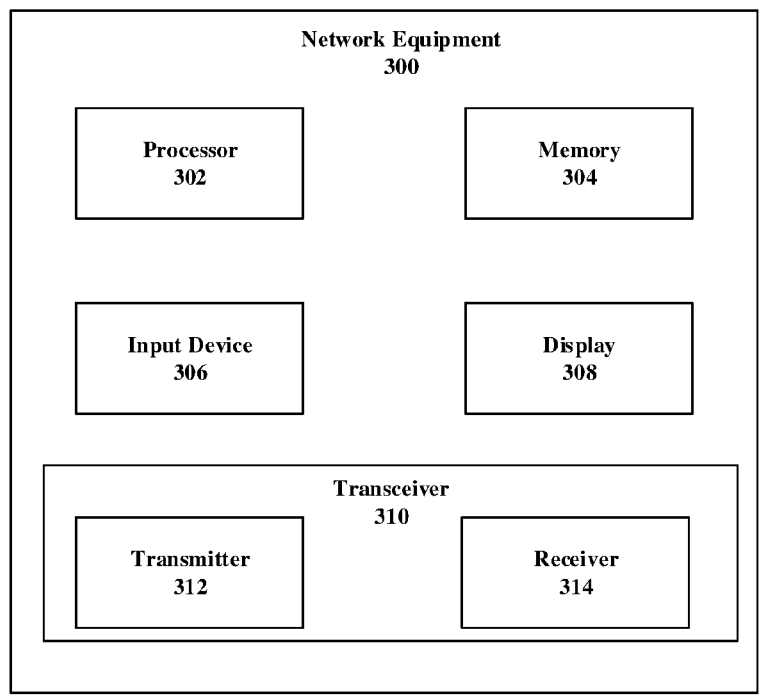
FIG. 3 is a schematic block diagram illustrating an apparatus that may be used for one-shot HARQ-ACK codebook determination according to one embodiment.

FIG. 3 is a schematic block diagram illustrating an apparatus that may be used for one-shot HARQ-ACK codebook determination. In one embodiment, the apparatus includes network equipment (NE) 300. The network equipment (NE) 300 may be an exemplary implementation of the NE 104 of FIG. 1.

The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals/data to the UE 200. The processor 302 may also control the transceiver 310 to receive UL signals/data from the UE 200. For example, the processor 302 may control the transceiver 310 to receive a HARQ-ACK codebook for one or more DL transmissions. In another example, the processor 302 may control the transceiver 310 to transmit DL signals for various configurations to the UE 200, as described above.

The transceiver 310, in one embodiment, is configured to communicate wirelessly with the UE 200. In certain embodiments, the transceiver 310 comprises a transmitter 312 and a receiver 314. The transmitter 312 is used to transmit DL communication signals to the UE 200 and the receiver 314 is used to receive UL communication signals from the UE 200. For example, the receiver 314 may receive a HARQ-ACK codebook from the UE 200. As another example, the transmitter 312 may transmit the various configurations/data of the NE 300.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, wherein the transceiver 310 includes a transmitter 312 and a receiver 314 for each cell or cell sector.

For transmission on unlicensed spectrum (NR-U), in order to achieve fair coexistence with other wireless systems, channel access procedure, also named LBT (listen before talk), is required before the transmission on unlicensed spectrum. By means of performing energy detection on a certain channel, if the received power is below a predefined threshold, the LBT is successful, which means the channel is deemed as empty and available for transmission; and if the received power is above the predefined threshold, the LBT is failed, which means the channel is occupied by other nodes or other wireless systems and is not available for transmission. Only when the LBT is successful, a piece of equipment can start its transmission on the channel and occupy the channel up to a maximum channel occupancy time (MCOT); otherwise, the equipment cannot start the transmission and continues to perform LBT until it is successful.

When HARQ-ACK feedback is to be transmitted on the unlicensed carrier, the LBT is needed before the HARQ-ACK transmission. If and only if the LBT is successful, a UE can start the HARQ-ACK transmission; otherwise, the UE has to give up the HARQ-ACK transmission. If the UE fails to transmit the HARQ-ACK feedback due to LBT failure, the corresponding PDSCHs have to be retransmitted since the gNB has no knowledge about the decoding results of the PDSCHs at the UE side.

Additionally, HARQ-ACK transmission on the unlicensed carrier suffers potential interference from hidden nodes. Even if UE has successfully transmitted the HARQ-ACK feedback, there are still possibilities that the gNB may fail to decode it. At the gNB side, if the gNB fails to detect the HARQ-ACK feedback in the predefined HARQ-ACK feedback timing, the gNB will have to assume NACKs and retransmit all the corresponding PDSCHs. Both the LBT failure and the hidden node problem may lead to unnecessary DL retransmission and DL performance degradation due to failed HARQ-ACK reception at the gNB side.

For NR access on the unlicensed spectrum (NR-U), one-shot HARQ-ACK feedback is discussed as a fallback solution for the semi-static and dynamic HARQ-ACK codebooks. In detail, as long as a triggering DCI is received by the UE, the UE shall transmit the HARQ-ACK bits for all configured downlink (DL) HARQ processes. In this way, not only the postponed HARQ-ACK feedback for PDSCHs in the earlier channel occupancy time (COT) but also the previously transmitted HARQ-ACK feedback can be triggered for transmission. This mechanism is applicable to both the semi-static and dynamic HARQ-ACK codebooks.

One-shot HARQ-ACK feedback may lead to a relatively large HARQ-ACK codebook, even much larger than the semi-static HARQ-ACK codebook. For example, the typical number of DL HARQ processes is 16, so the one-shot HARQ-ACK codebook size is equal to 16 for single-codeword transmission mode or 32 for two-codeword transmission. The benefit of one-shot HARQ-ACK feedback is that the codebook size determination is quite simple. There is no ambiguity between the UE and the gNB on determining the HARQ-ACK codebook size even when some DL transmissions are missed.

For one-shot HARQ-ACK feedback, the misunderstanding between the gNB and the UE on the HARQ-ACK codebook occurs when the UE has already reported ACK for a given HARQ process and missed a new DL assignment for the given HARQ process. An example of one-shot HARQ-ACK feedback illustrating the misunderstanding is shown in FIG. 4A.

Figure 4A:
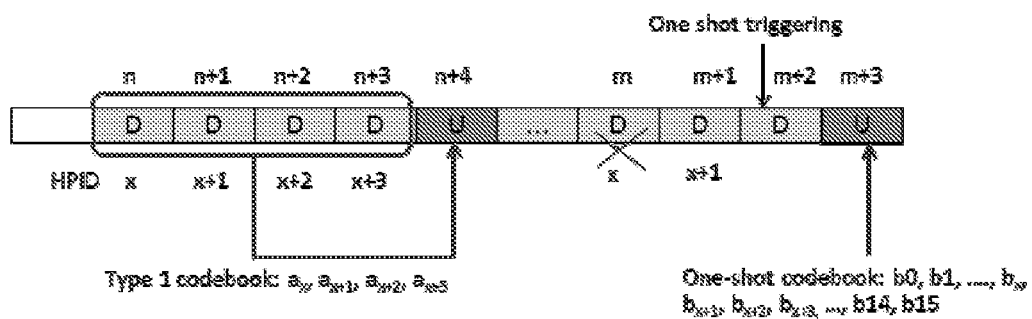
FIG. 4A is a schematic diagram illustrating one-shot HARQ-ACK feedback according to one embodiment.

In FIG. 4A, the semi-static HARQ-ACK codebook is configured to the UE. The UE may be configured with the dynamic HARQ-ACK codebook as well in practice. Assuming K1 set includes {1, 2, 3, 4} for simplicity, the corresponding HARQ process IDs are x, x+1, x+2, x+3 for PDSCHs in slot n, n+1, n+2, n+3, respectively. Thus, the 4 HARQ-ACK information bits, $a_x$, $a_{x+1}$, $a_{x+2}$, and $a_{x+3}$, corresponding to PDSCHs in slot n, n+1, n+2, n+3, are generated as the semi-static HARQ-ACK codebook and transmitted in slot n+4 without consideration of Carrier Aggregation (CA), Code Block Group (CBG) and Multiple-Input Multiple-Output (MIMO).

Assuming the gNB transmits one DCI in slot m for scheduling DL transmissions for HARQ process x and transmits a one-shot triggering DCI in slot m+2 to trigger the UE to report HARQ-ACK feedback for all the configured 16 HARQ processes in slot m+3. At the UE side, upon reception of the one-shot triggering DCI, the UE shall generate b0, b1, b2, . . . , b15, in the order of the HARQ process IDs, for the 16 HARQ processes as the one-shot HARQ-ACK codebook. When the DCI in slot m for scheduling HARQ process x is missed or not received by the UE, the UE has no knowledge that the HARQ process x is rescheduled for new transmission. Thus, the UE reuses the latest HARQ-ACK information bit for HARQ process x, $a_x$, for PDSCH in slot n, as the HARQ-ACK information bit for HARQ process x, $b_x$, in the one-shot HARQ-ACK codebook. If $a_x$ is an ACK in the earlier Type 1 (semi-static HARD-ACK) codebook, $b_x$ reuses the ACK for $a_x$ and it is reported in the one-shot HARD-ACK codebook to the gNB. In this case, the gNB assumes that the TB transmitted for HARQ process x scheduled in slot m is successfully received by the UE and thus will not retransmit it. Nevertheless, the UE actually missed that DL transmission. From the perspective of the physical layer, the UE loses (or misses) the TB unless Radio Link Control (RLC) Automatic Repeat Request (ARQ) is started.

Figure 4B:
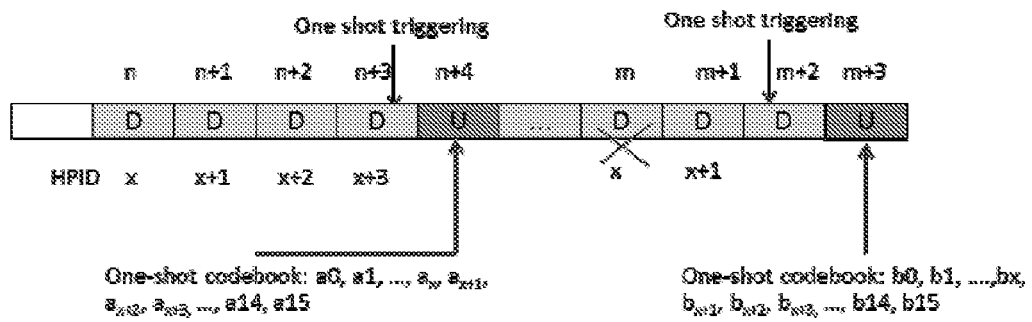
FIG. 4B is a schematic diagram illustrating one-shot HARQ-ACK feedback according to one embodiment.

Similar issue also occurs when a DCI for a given HARQ process is missed between two successive one-shot triggering DCIs as shown in FIG. 4B. In FIG. 4B, the gNB assumes that the TB transmitted for HARQ process x scheduled in slot m between the two one-shot triggering DCIs is successfully received by the UE and thus will not retransmit it. Nevertheless, the UE actually missed that DL transmission.

It is noted that only one TB is carried by one PDSCH and each TB is acknowledged with one-bit ACK or NACK in both FIG. 4A and FIG. 4B. In the case where up to two TBs are configured for one PDSCH or CBG-based retransmission is configured for PDSCH, each HARQ process will be acknowledged with C*M bits, where C is the number of TB configured for one PDSCH and M is the RRC configured maximum number of CBGs per TB. As a result, the one-shot HARQ-ACK codebook includes N*C*M bits, where N is the number of configured DL HARQ processes.

To address such error cases, several methods may be used. The first way is to indicate NDI for each HARQ process in the triggering DCI. However, this impacts DCI design. Apparently, this is not suitable for using DL assignment or UL grant as the triggering DCI. The second way is to indicate NDI for each HARQ process in the one-shot HARQ-ACK codebook. The drawback is too much overhead for the overhead is doubled. The third way is to always assume NACK for a HARQ process which has been already reported. The problem of this approach is that the HARQ-ACK retransmission opportunity is lost.

In the disclosure, apparatus and methods for one-shot HARQ-ACK codebook determination are provided for NR access on unlicensed spectrum (NR-U), and several approaches to handle the aforementioned error cases are disclosed.

According to some embodiments, the one-shot HARQ-ACK codebook includes two parts: a first part including the HARQ-ACK information bits for each HARQ process, which are concatenated in the order of HARQ process ID; and a second part, each bit in the second part corresponding to one of the HARQ processes with positive acknowledgement reported in the first part for the one HARQ process.

In some embodiments, the second part of of the one-shot HARQ-ACK codebook includes X retransmitted ACK indication (RAI) bits.

The total one-shot HARQ-ACK codebook size is equal to N*C*M+X, where N is the number of configured DL HARQ processes, C is the RRC configured maximum number of TBs which can be carried on one PDSCH, and M is the RRC configured maximum number of CBGs per TB. In the case that spatial bundling is adopted or only one TB can be carried on one PDSCH, C is equal to 1. In the case that the CBG-based retransmission is not configured, M is equal to 1.

The RAI is used to indicate whether the information bit of ACK for a given HARQ process is retransmitted or initially transmitted in the one-shot HARQ-ACK codebook. Since the RAI is introduced to solve the error case where the DCI that schedules one or two TBs or multiple CBGs for a given HARQ process is missed, one RAI bit corresponds to the given HARQ process. Therefore, the number of RAI bits in the second part is not larger than the number of configured DL HARQ processes. For simplicity, in the following examples, it is assumed that one PDSCH can carry only one TB and CBG-based retransmission is not configured. Such configuration is only for illustrative purposes, and the disclosure is not intended to be limited to this.

Figure 5:
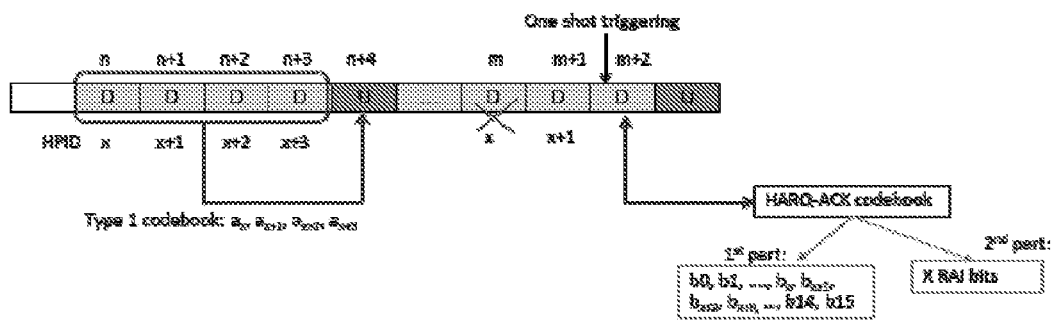
FIG. 5 is a schematic diagram illustrating error case handling for one-shot HARQ-ACK feedback according to one embodiment.

As shown in FIG. 5, when the UE reports ACK in slot n+4 for HARQ process x and misses DL assignment in slot m for scheduling HARQ process x, in the one-shot HARQ-ACK codebook, the UE retransmits $a_x$ (i.e., ACK for PDSCH in slot n), as $b_x$ in the first part, and indicates the RAI as "1" for the HARQ process x in the second part. Here, RAI of "1" represents that the corresponding ACK was reported in an earlier HARQ-ACK codebook (e.g., the Type 1 HARQ-ACK codebook in FIG. 5) and is retransmitted in the current one-shot HARQ-ACK codebook; and RAI of "0" represents that the corresponding ACK is newly generated for the given HARQ process x after the previous HARQ-ACK reporting and is initially transmitted in the current one-shot HARQ-ACK codebook. That is, RAI of "1" implies that a same ACK bit for a same PDSCH for a given HARQ process is reported, i.e., there is no new DL scheduling for the given HARQ process detected by the UE between the previous HARQ-ACK reporting and the current one-shot triggering DCI. RAI of "0" implies that different ACK bits for different PDSCHs for a given HARQ process, i.e., there is new DL scheduling for the given HARQ process correctly decoded by the UE between the previous HARQ-ACK reporting and the current one-shot DCI triggering.

In an example, assuming that the HARQ-ACK information bits for HARQ processes x and x+1 in slot n and n+1 are ACKs, i.e., $a_x$=ACK and $a_{x+1}$=ACK, and the DCI in slot m for scheduling HARQ process x is missed by the UE, and the DCI in slot m+1 for scheduling HARQ process x+1 is detected and the associated PDSCH is correctly decoded by the UE. Hence, in the one-shot HARQ-ACK codebook, $b_x$=ACK and $b_{x+1}$=ACK, where $b_x$=ACK is the retransmission of the ACK for PDSCH in slot n and $b_{x+1}$=ACK is the initial transmission of the ACK for PDSCH in slot m+1. To differentiate whether a same ACK or a different ACK for HARQ process x or x+1 is reported in the current one-shot HARQ-ACK codebook compared with the previous HARQ-ACK codebook, in the second part, the RAI for HARQ process x is set to "1", implying that this ACK is retransmission of an earlier ACK and the RAI for HARQ process x+1 is set to "0", implying that this ACK is a new ACK which is different from the corresponding earlier ACK in the previous HARQ-ACK codebook.

In this way, upon reception of the current one-shot HARQ-ACK codebook at the gNB side, the gNB can know that the DCI in slot m is missed by the UE due to the reported RAI of "1" and will retransmit the data (scheduled by the missed DCI) in a following slot.

Since one RAI bit indicates or represents a retransmitted ACK or an initially transmitted ACK for a given HARQ process, a mapping relationship is established between a RAI bit and the corresponding HARQ process.

In one embodiment, X is set to the number of configured DL HARQ processes. Here, each of the X RAI bits in the second part of the one-shot HARQ-ACK codebook corresponds to one of the configured DL HARQ processes. Thus, the aforementioned error cases can be eliminated, but the drawback is that the signalling overhead is high when 16 DL HARQ processes are configured.

In one embodiment, X is set to a fixed value according to a standard or a fixed value configured by Radio Resource Control (RRC) signalling. For example, X is set to 2, 4, 8 or other values. According to the statistics probability of error case occurrence, the gNB can configure a suitable value for X, where X is smaller than the configured number of DL HARQ processes. The following options may be used.

Option 1: the X RAI bits in the second part correspond to the first X HARQ processes of a subset S of the N configured HARQ processes, where each of the HARQ processes in the subset S or each of the S HARQ processes is reported with ACK both in the previous HARQ-ACK codebook and the current one-shot HARQ-ACK codebook.

As shown in FIG. 5, for the HARQ process x, if $a_x$=ACK and $b_x$=NACK, the HARQ process x is not included in the S HARQ processes; if $a_x$=NACK and $b_x$=ACK, the HARQ process x is also not included in the S HARQ processes; and only if $a_x$=ACK and $b_x$=ACK, the HARQ process x is included in the S HARQ processes.

Here, only the corresponding RAI bits of the first X processes of the S HARQ processes are included in the second part. By comparing the two HARQ-ACK codebooks (the previous HARQ-ACK codebook and the current HARQ-ACK codebook), the gNB can determine which HARQ process a reported RAI bit corresponds to. If S>X, the last S-X HARQ processes of the S HARQ processes are not reported with corresponding RAI bits. If S=0, X "NACK" bits or "ACK" bits are padded in the second part.

For example, (ACK, ACK, NACK, ACK) are reported in slot n+4 for HARQ processes x, x+1, x+2 and x+3, and the UE misses the DCI in slot m, and detects the DCI in slot m+1 and correctly decodes PDSCH scheduled by the DCI in slot m+1. Assuming X=4 and S=2, the UE then reports ACK, ACK for HARQ processes x and x+1 in the first part of the one-shot HARQ-ACK codebook and indicates 4 RAI bits (X=4) in the second part as 1, 0, 0, 0, where "1" represents that the ACK for HARQ process x is retransmitted, the first "0" represents that the ACK for HARQ process x+1 is newly generated and initially transmitted, and the last two "0" are padding bits. Assuming X=4, S=6, the UE then reports 4 RAI bits, "1, 0, 0, 0", corresponding to first 4 HARQ processes of the 6 HARQ processes, where "1" represents that the ACK for HARQ process x is retransmitted, the first "0" represents that the ACK for HARQ process x+1 is newly generated and initially transmitted, and the last two "0"s represent the RAI bits for the third and fourth HARQ processes of the 6 HARQ processes.

If the first HARQ-ACK codebook (or the previous HARQ-ACK codebook) is not correctly received by the gNB due to hidden node interference or the previous HARQ-ACK codebook is not transmitted by the UE due to LBT failure, the gNB does not necessarily schedule DL transmissions on HARQ processes x, x+1, x+2 and x+3. In this case, after transmitting the one-shot triggering DCI, the gNB detects the first part of the one-shot HARQ-ACK codebook and neglects the second part.

Option 2: the X RAI bits in the second part correspond to the last X HARQ processes of a subset S of the N configured HARQ processes, where each of the S HARQ processes is reported with ACK both in the previous HARQ-ACK codebook and in the current one-shot HARQ-ACK codebook. The details for determining the S HARQ processes and the RAI bits are similar to Option 1.

In one embodiment, X is dynamically indicated in the triggering DCI. With dynamic indication of X in the triggering DCI, the gNB can adaptively adjust the value of X according to the number of ACK bits received in the previous HARQ-ACK codebook.

For example, assuming there are Z1 HARQ processes reported with ACK in the previous HARQ-ACK codebook, and the gNB schedules Z2 HARQ processes of the Z1 HARQ processes between the previous HARQ-ACK codebook and the current triggering DCI with toggled NDI for new data transmission. Theoretically, at most Z2 HARQ processes need RAI bits in the second part of the one-shot HARQ-ACK codebook when all the Z2 HARQ processes are correctly decoded and acknowledged with ACK by the UE. In this case, setting the value of X to Z2 in the triggering DCI can solve the problem of the error cases.

As shown in FIG. 5, assuming that 4 HARQ-ACK information bits, $a_x$, $a_{x+1}$, $a_{x+2}$, and $a_{x+3}$, are (ACK, ACK, NACK, ACK), there are 3 HARQ processes reported as ACK in the Type 1 HARQ-ACK codebook, i.e., HARQ processes x, x+1 and x+3. Further assuming that the HARQ processes x and x+1 are scheduled for new data transmission in slot m and m+1, respectively, that is, there are two HARQ processes from the aforementioned three HARQ processes scheduled between the Type 1 HARQ-ACK reporting and the one-shot triggering DCI, thus, at most two HARQ processes, i.e., HARQ processes x and x+1, may be reported with ACK in both the Type 1 HARQ-ACK codebook and the one-shot HARQ-ACK codebook. In this case, the gNB can indicate the value of X as 2 in the triggering DCI, where 2 RAI bits are enough to avoid the error cases.

Upon reception of the triggering DCI, the UE can set the value of X to 2 and generate 2 RAI bits in the second part of the one-shot HARQ-ACK codebook corresponding to HARQ processes x and x+1.

The number of bits for indicating X in the triggering DCI is equal to ceil(log 2(N)), where N is the number of the configured DL HARQ processes. When 16 DL HARQ processes are configured, 4 bits are needed to indicate up to 16 HARQ processes which are reported ACK in both the previous HARQ-ACK codebook and the one-shot HARQ-ACK codebook in the extreme case.

In some cases, if the first HARQ-ACK codebook or the previous HARQ-ACK codebook is not correctly received by the gNB due to hidden node interference or it is not transmitted by the UE due to LBT failure, the gNB indicates X as 0 in the triggering DCI. Upon reception of this triggering DCI, the UE transmits the first part of the one-shot HARQ-ACK codebook and drops the second part.

In the embodiments, the retransmitted ACK indication (RAI) may also be referred to as "same ACK indication" or "outdated ACK indication" or "previous/earlier ACK indication". The disclosure does not limit to this.

In some embodiments, the second part of the one-shot HARQ-ACK codebook includes the latest received New Data Indication (NDI) bits for X DL HARQ processes.

In the embodiments, the total one-shot HARQ-ACK codebook size is equal to N*C*M+C*X, where N is the number of configured DL HARQ processes, C is the RRC configured maximum number of TBs which can be carried on one PDSCH, and M is the RRC configured maximum number of CBGs per TB. In the case that spatial bundling is adopted or only one TB can be carried on one PDSCH, C is equal to 1. In the case that CBG-based retransmission is not configured, M is equal to 1.

Since one-bit NDI corresponds to one TB, when 2 TBs are carried on one PDSCH, there are two NDI bits in the DCI scheduling the PDSCH.

Each NDI bit in the second part is the latest received NDI bit for a TB of the UE, for a given HARQ process. For simplicity, in the following examples, it is assumed that one PDSCH can carry only one TB and CBG-based retransmission is not configured. Such configuration is only for illustrative purposes, and the disclosure is not intended to be limited to this.

Figure 6:
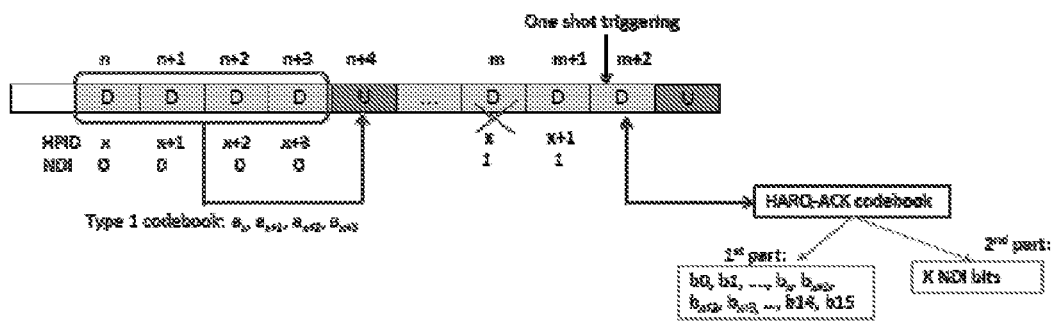
FIG. 6 is a schematic diagram illustrating error case handling for one-shot HARQ-ACK feedback according to one embodiment.

As shown in FIG. 6, assuming NDI of "0" is indicated in the DCI scheduling PDSCHs in slot n, n+1, n+2, n+3, for HARQ process x, the UE reports $a_x$ as ACK in slot n+4 and the gNB transmits the DCI in slot m with toggled NDI ("1") for scheduling new TB transmission. If the UE misses this DCI in slot m, in the one-shot HARQ-ACK codebook, the UE will retransmit $a_x$ (i.e., ACK for PDSCH in slot n), as $b_x$ in the first part, and indicate NDI of "0" for the HARQ process x in the second part because the latest NDI is "0" received in slot n at the UE side.

For HARQ process x+1, the UE reports $a_{x+1}$ as ACK in slot n+4 and the gNB transmits the DCI in slot m+1 with toggled NDI ("1") for scheduling new TB transmission. When the UE detects this DCI in slot m+1 for scheduling HARQ process x+1 and correctly decodes the associated PDSCH, in the one-shot HARQ-ACK codebook, the UE will generate ACK as $b_{x+1}$ in the first part, and indicate its latest NDI of "1" received in slot m+1 for the HARQ process x+1 in the second part.

In this way, upon reception of the one-shot HARQ-ACK codebook at the gNB side, for a given HARQ process, by comparing the latest transmitted NDI bit in the DCI and the received NDI bit in the second part of the one-shot HARQ-ACK codebook, the gNB can know whether the DCI is missed or not.

In the example shown in FIG. 6, at the gNB side, for HARQ process x, the latest NDI bit is "1" which is transmitted in the DCI in slot m. However, the received NDI bit in the second part of the one-shot HARQ-ACK codebook is "0". As these two bits are not the same, the gNB knows that the DCI in slot m is missed and will schedule retransmission of the data in a following slot. Similarly, at the gNB side, for HARQ process x+1, the latest NDI bit is "1" which is transmitted in the DCI in slot m+1, and the received NDI bit in the second part of the one-shot HARQ-ACK codebook is "1". Thus, the gNB knows that the DCI in slot m+1 is not missed and the associated PDSCH is correctly decoded, and the gNB will schedule transmission of new data in a following slot.

Since the NDI bit in the second part indicates the latest received NDI for a TB for a given HARQ process, a mapping relationship is established between one NDI bit and the corresponding HARQ process.

In one embodiment, X is set to the number of configured DL HARQ processes. Here, every C bits of the C*X NDI bits in the second part of the one-shot HARQ-ACK codebook corresponds to one configured HARQ process, where C is the RRC configured maximum number of TBs which can be carried on one PDSCH. Each group of C bits corresponds to one TB. The drawback of the embodiment is that signalling overhead is high when 16 DL HARQ processes are configured.

In one embodiment, X is set to a fixed value according to a standard or a semi-static value configured by RRC signalling. For example, X is 2, 4, 8 or other values. According to the statistics probability of error case occurrence, the gNB can configure a suitable value for X, where X is smaller than the configured number of DL HARQ processes. The following options may be used.

Option 1: the C*X NDI bits in the second part correspond to the first X HARQ processes of a subset S of the N configured HARQ processes, where each of the HARQ processes in the subset S or each of the S HARQ processes is reported with ACK both in the previous HARQ-ACK codebook and in the current one-shot HARQ-ACK codebook. For simplicity, in the following examples, it is assumed that one PDSCH can carry only one TB and CBG-based retransmission is not configured. Here, one NDI bit is included in the DCI scheduling PDSCH.

As shown in FIG. 6, for HARQ process x, if $a_x$=ACK and $b_x$=NACK, the HARQ process x is not included in the S HARQ processes; if $a_x$=NACK and $b_x$=ACK, the HARQ process x is also not included in the S HARQ processes; and only if $a_x$=ACK and $b_x$=ACK, the HARQ process x is included in the S HARQ processes.

Here, only the corresponding NDI bits of the first X processes of the S HARQ processes are included in the second part. By comparing the two HARQ-ACK codebooks, the gNB can determine which HARQ process a reported NDI bit corresponds to. If S>X, the last S-X HARQ processes of the S processes are not reported with corresponding NDI bits. If S=0, X "NACK" bits or "ACK" bits are padded in the second part.

For example, (ACK, ACK, NACK, ACK) are reported in slot n+4 for HARQ processes x, x+1, x+2 and x+3, and the UE misses the DCI in slot m, and detects the DCI in slot m+1 and correctly decodes PDSCH scheduled by the DCI in slot m+1. Assuming S=2 and X=4, the UE then reports ACK, ACK for HARQ processes x and x+1 in the first part of the one-shot HARQ-ACK codebook and indicates 4 NDI bits in the second part as 0, 1, 0, 0, where "1" represents the latest received NDI for HARQ process x+1 is 1, the first "0" represents the latest received NDI for HARQ process x is 0, and the last two "0"s are padding bits. Assuming X=4, N=6, the UE then reports 4 NDI bits, "0, 1, 0, 0", corresponding to the first 4 HARQ processes of the 6 HARQ processes, where the first "0" represents the latest received NDI for HARQ process x is 0, "1" represents the latest received NDI for HARQ process x+1 is 1, and the last two "0"s represent the latest NDI bits for the third and fourth HARQ processes of the 6 HARQ processes.

For a given HARQ process, by comparing the latest transmitted NDI bit in the DCI and the received NDI bit in the second part of the one-shot HARQ-ACK codebook, the gNB can determine whether the DCI is missed or not. In the example shown in FIG. 6, by comparing the latest transmitted NDI bit "1" for HARQ-ACK process x and the received NDI bit "0" in the second part of the HARQ-ACK codebook, the gNB can determine that the DCI in slot m is missed and will retransmit the missed DCI in a following slot.

If the first HARQ-ACK codebook (or the previous HARQ-ACK codebook) is not correctly received by the gNB due to hidden node interference or the previous HARQ-ACK codebook is not transmitted by the UE due to LBT failure, the gNB detects the first part of the one-shot HARQ-ACK codebook and neglects the second part.

Option 2: the C*X NDI bits in the second part correspond to the last X HARQ processes of a subset S of the configured HARQ processes, where each of the S HARQ processes is reported with ACK both in the previous HARQ-ACK codebook and in the current one-shot HARQ-ACK codebook. The details for determining the S HARQ processes and the NDI bits are similar to Option 1.

In one embodiment, X is dynamically indicated in the triggering DCI. With dynamic indication of X in the triggering DCI, the gNB can adaptively adjust the value of X according to the number of ACK bits received in the previous HARQ-ACK codebook.

For example, assuming there are Z1 HARQ processes reported with ACK in the previous HARQ-ACK codebook, and the gNB schedules Z2 HARQ processes of the Z1 HARQ processes between the previous HARQ-ACK codebook and the current triggering DCI with toggled NDI for new data transmission. Theoretically, at most Z2 HARQ processes need NDI bits in the second part of the one-shot HARQ-ACK codebook when all the Z2 HARQ processes are correctly decoded and acknowledged with ACK by the UE. In this case, setting the value of X to Z2 in the triggering DCI can solve problem of the error cases.

As shown in FIG. 6, assuming that 4 HARQ-ACK information bits, $a_x$, $a_{x+1}$, $a_{x+2}$, and $a_{x+3}$, are ACK, ACK, NACK, ACK, there are 3 HARQ processes reported as ACK in the Type 1 HARQ-ACK codebook, i.e., HARQ processes x, x+1 and x+3. Further assuming that HARQ processes x and x+1 are scheduled for new data transmission in slot m and m+1, respectively, that is, there are two HARQ processes from the aforementioned three HARQ processes are scheduled between the Type 1 HARQ-ACK reporting and the one-shot triggering DCI, thus, at most two HARQ processes, i.e., HARQ processes x and x+1, may be reported ACK in both the Type 1 HARQ-ACK codebook and one-shot HARQ-ACK codebook. In this case, gNB can indicate the value of X as 2 in the triggering DCI, where 2 NDI bits are enough to avoid the error cases.

Upon reception of the triggering DCI, the UE may set the value of X to 2 and generate 2 NDI bits in the second part of the one-shot HARQ-ACK codebook corresponding to HARQ processes x and x+1.

The number of bits for indicating X in the triggering DCI is equal to ceil(log 2(N)), where N is the number of configured DL HARQ processes. When 16 HARQ processes are configured, 4 bits are needed to indicate up to 16 HARQ processes which are reported ACK in both the previous HARQ-ACK codebook and the one-shot HARQ-ACK codebook in the extreme case.

In some cases, if the first HARQ-ACK codebook (or the previous HARQ-ACK codebook) is not correctly received by the gNB due to hidden node interference or it is not transmitted by the UE due to LBT failure, the gNB indicates X as 0 in the triggering DCI. Upon reception of this triggering DCI, the UE transmits the first part of the one-shot HARQ-ACK codebook and drops the second part.

Figure 7:
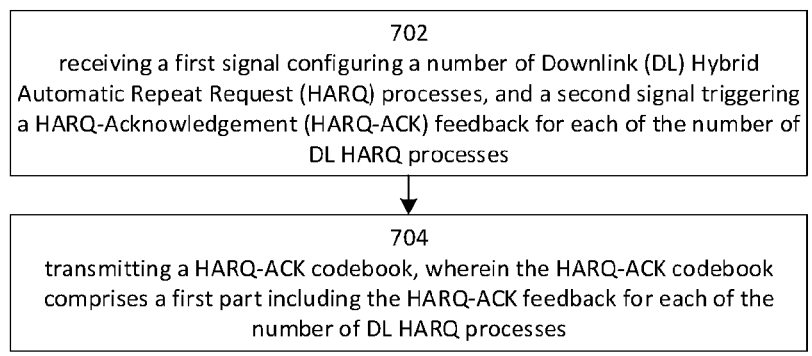
FIG. 7 is a flow chart illustrating steps of one-shot HARQ-ACK codebook determination according to one embodiment.

FIG. 7 is a flow chart illustrating steps of one-shot HARQ-ACK codebook determination at the UE side.

At step 702, the receiver 214 at the UE side receives a first signal (e.g., a RRC signaling) configuring a number of Downlink (DL) Hybrid Automatic Repeat Request (HARQ) processes, and a second signal (e.g., a triggering DCI) triggering a HARQ-Acknowledgement (HARQ-ACK) feedback for each of the number of DL HARQ processes.

At step 704, the transmitter 212 at the UE side transmits a HARQ-ACK codebook including a first part, the first part including the HARQ-ACK feedback for each of the number of DL HARQ processes.

The HARQ-ACK feedback for each of the number of DL HARQ processes may be concatenated in an order of HARQ process ID in the first part.

The HARQ-ACK codebook may further include a second part and each bit in the second part corresponds to a HARQ process of the number of DL HARQ process with positive acknowledgement reported in the first part for the HARQ process. The details for the HARQ-ACK codebook determination are discussed above with reference to FIG. 5 and FIG. 6, and thus are not repeated here. The processor 202 at the UE side may carry out processing required in the HARQ-ACK codebook determination, for example, the determination of the first part and the second part.

Figure 8:
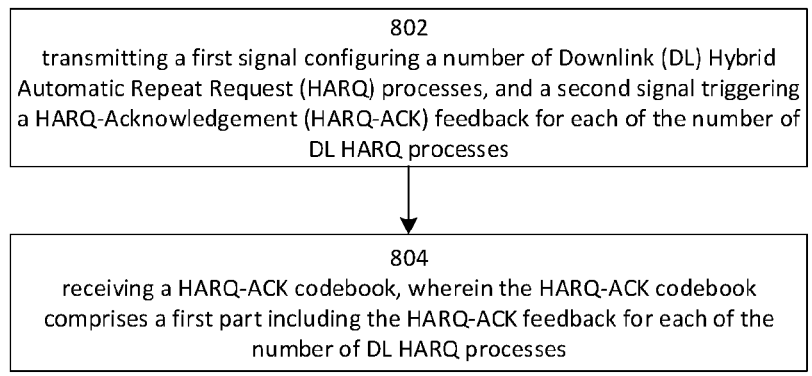
FIG. 8 is a flow chart illustrating steps of one-shot HARQ-ACK codebook determination according to one embodiment.

FIG. 8 is a flow chart illustrating steps of one-shot HARQ-ACK codebook determination at the gNB side.

At step 802, the transmitter 312 at the gNB side transmits a first signal (e.g., a RRC signaling) configuring a number of Downlink (DL) Hybrid Automatic Repeat Request (HARQ) processes, and a second signal (e.g., a triggering DCI) triggering a HARQ-Acknowledgement (HARQ-ACK) feedback for each of the number of DL HARQ processes.

At step 804, the receiver 314 at the gNB side receives a HARQ-ACK codebook including a first part, the first part including the HARQ-ACK feedback for each of the number of DL HARQ processes.

The HARQ-ACK feedback for each of the number of DL HARQ processes may be concatenated in an order of HARQ process ID in the first part.

The HARQ-ACK codebook may further include a second part and each bit in the second part corresponds to a HARQ process of the number of DL HARQ process with positive acknowledgement reported in the first part for the HARQ process.

The processor 302 at the gNB side may carry out processing required to decode the HARQ-ACK codebook.

With the HARQ-ACK codebook disclosed, the misunderstanding between the gNB and the UE on the one-shot HARQ-ACK codebook is avoided.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. An apparatus comprising:
a receiver that receives a first signal configuring a number of downlink (DL) hybrid automatic repeat request (HARQ) processes, and a second signal triggering a HARQ acknowledgment (HARQ-ACK) feedback for each of the number of DL HARQ processes; and
a transmitter that transmits a HARQ-ACK codebook, wherein the HARQ-ACK codebook comprises a first part including the HARQ-ACK feedback for each of the number of DL HARQ processes.

2. The apparatus of claim 1, wherein the HARQ-ACK codebook further comprises a second part and each bit in the second part corresponds to a HARQ process of the number of DL HARQ process with positive acknowledgement reported in the first part for the HARQ process.

3. The apparatus of claim 2, wherein each bit in the second part indicates whether the positive acknowledgement in the first part for the HARQ process is retransmitted from an earlier HARQ-ACK feedback or initially transmitted.

4. The apparatus of claim 2, wherein the second part comprises X bits and X is equal to the number of DL HARQ processes.

5. The apparatus of claim 4, wherein each bit in the second part corresponds to one DL HARQ process of the number of DL HARQ processes.

6. The apparatus of claim 2, wherein the second part comprises X bits and X is configured by radio resource control (RRC) signaling.

7. The apparatus of claim 6, wherein the X bits correspond to the first or last X HARQ processes of a subset of the number of DL HARQ processes, wherein each of the subset of the number of DL HARQ processes is reported positive acknowledgement both in an earlier HARQ-ACK codebook and in the HARQ-ACK codebook.

8. The apparatus of claim 2, wherein the second part comprises X bits and X is indicated in the second signal.

9. The apparatus of claim 8, wherein X is equal to a number of positive acknowledgement bits in an earlier HARQ-ACK codebook or a number of DL transmissions between a first time instance for reporting the earlier HARQ-ACK codebook and a second time instance for reporting the HARQ-ACK codebook.

10. The apparatus of claim 2, wherein each bit in the second part indicates whether the positive acknowledgement in the first part for the HARQ process is same or different to an earlier HARQ-ACK feedback.

11. The apparatus of claim 2, wherein each bit in the second part indicates whether the positive acknowledgement in the first part for the HARQ process is new positive acknowledgement or outdated positive acknowledgement.

12. The apparatus of claim 2, wherein each bit in the second part is a latest received new data indicator (NDI) bit corresponding to the HARQ process.

13. The apparatus of claim 2, wherein each bit in the second part is a latest received new data indicator (NDI) bit corresponding to a transport block of the HARQ process.

14. The apparatus of claim 1, wherein the HARQ-ACK feedback for each of the number of DL HARQ processes is concatenated in an order of HARQ process ID in the first part.

15. The apparatus of claim 1, wherein the first signal is RRC signaling and the second signal is downlink control information (DCI).

16. An apparatus comprising:
a transmitter that transmits a first signal configuring a number of DL HARQ processes, and a second signal triggering a HARQ-ACK feedback for each of the number of DL HARQ processes; and
a receiver that receives a HARQ-ACK codebook, wherein the HARQ-ACK codebook comprises a first part including the HARQ-ACK feedback for each of the number of DL HARQ processes.

17. The apparatus of claim 16, wherein the HARQ-ACK codebook further comprises a second part and each bit in the second part corresponds to a HARQ process of the number of DL HARQ process with positive acknowledgement reported in the first part for the HARQ process.

18. The apparatus of claim 17, wherein each bit in the second part is a latest received NDI bit corresponding to the HARQ process.

19. The apparatus of claim 16, wherein the HARQ-ACK feedback for each of the number of DL HARQ processes is concatenated in an order of HARQ process ID in the first part.

20. A method comprising:
receiving a first signal configuring a number of DL HARQ processes, and a second signal triggering a HARQ-ACK feedback for each of the number of DL HARQ processes; and
transmitting a HARQ-ACK codebook, wherein the HARQ-ACK codebook comprises a first part including the HARQ-ACK feedback for each of the number of DL HARQ processes.

* * * * *